June 26, 1956  E. ORENICK  2,751,789
MECHANICAL MOVEMENT
Filed May 21, 1953  3 Sheets-Sheet 1

INVENTOR.
EMIL ORENICK
BY
Sanford Schnurmacher
ATTORNEY

June 26, 1956  E. ORENICK  2,751,789
MECHANICAL MOVEMENT
Filed May 21, 1953  3 Sheets-Sheet 2
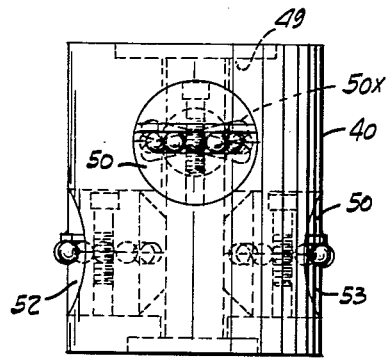
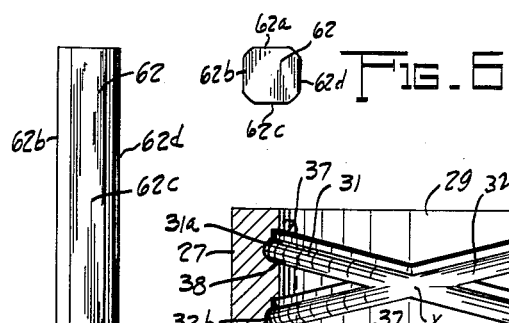
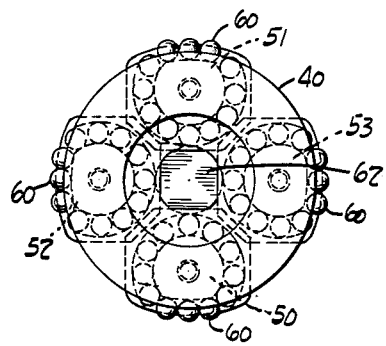
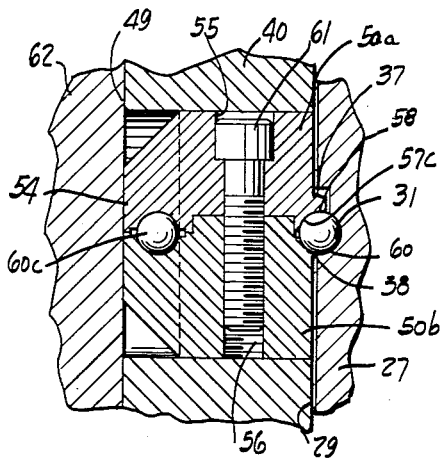
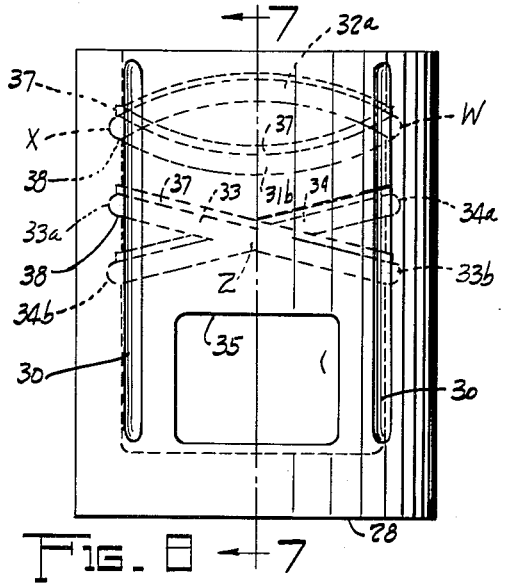
INVENTOR.
EMIL ORENICK
BY
Sanford Schnurmacher
ATTORNEY June 26, 1956  E. ORENICK  2,751,789
MECHANICAL MOVEMENT
Filed May 21, 1953  3 Sheets-Sheet 3

INVENTOR.
EMIL ORENICK
BY Sanford Schumacher
ATTORNEY

United States Patent Office 2,751,789
Patented June 26, 1956

2,751,789

MECHANICAL MOVEMENT

Emil Orenick, Parma, Ohio

Application May 21, 1953, Serial No. 356,570

3 Claims. (Cl. 74—57)

This invention relates to die cutting tools and particularly to punch presses.

The primary object of this invention is to provide a mechanical movement capable of operating at reciprocating speeds of over 2,000 strokes per minute.

Another object is to provide a mechanical movement whose reciprocating element, or ram, operates on a simple harmonic curve with smooth acceleration and deceleration at the end of each stroke.

A further object is to provide a high speed mechanical movement that uses free rolling balls to translate rotary motion to reciprocating motion in the ram, without vibration and a minimum of friction.

Still another object is to provide a device of the type stated that has only one reciprocating part, thus assuring a long life and low maintenance cost.

These and other objects of the invention will become apparent from a reading of the following specification and claims, together with the accompanying drawing wherein:

Figure 3 is a front elevational view of the rotor with the cam followers in position;

Figure 4 is a top plan view of the same;

Figure 5 is a side elevation of the cam follower housing positioning bar;

Figure 6 is a top plan view of the same;

Figure 7 is a vertical sectional view of the ram, taken along the line and in the direction of the arrows 7—7 of the Figure 8;

Figure 8 is a front elevation of the ram;

Figure 9 is a vertical sectional view through one of the cam followers and its associated cam track;

Figure 1:
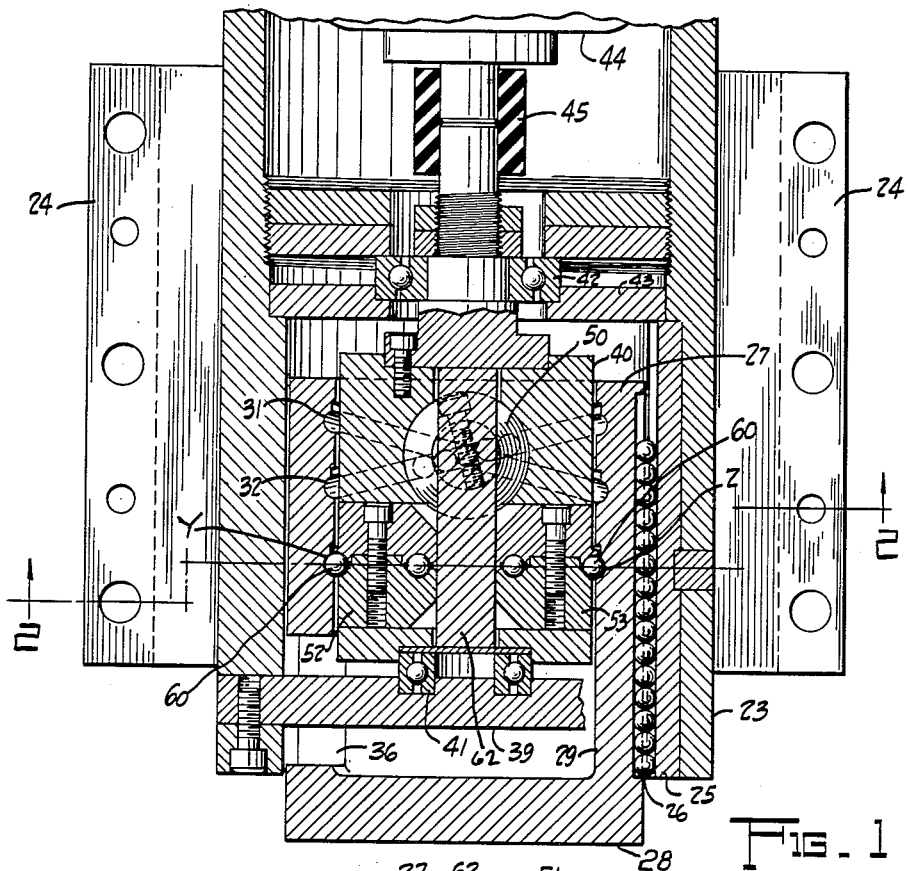
Figure 1 is a vertical sectional view of the mechanical movement that is the subject of this invention, showing the head, rotor, and ram.

Referring more particularly to the drawings, there is seen in Figure 1 a vertical sectional view of the mechanical movement that is the subject of this invention.

While the device is described hereinafter in relation to its application to a high speed press for punching out small stampings from a web of sheet metal, paper, fiber, or similar light weight material used in making washers, solder-lugs, and the like, it is to be understood that it is adapted for use in any situation wherein a high speed reciprocating mechanical movement is indicated.

Figure 2:
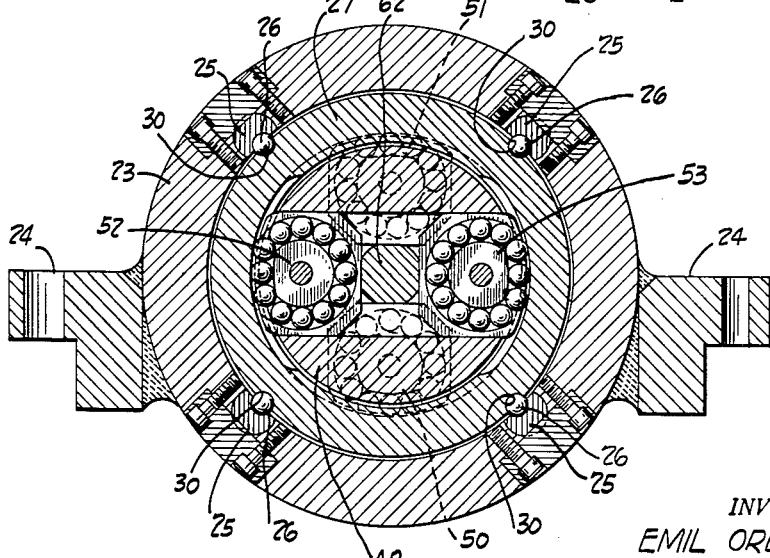
Figure 2 is a horizontal sectional view taken along the line and in the direction of the arrows 2—2 of the Figure 1.
Figure 10:
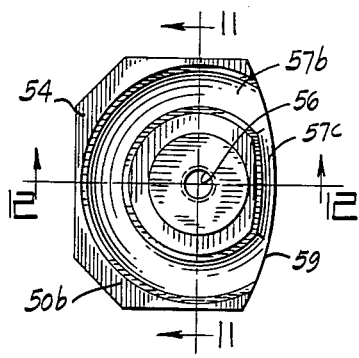
Figure 10 is a top plan view of the lower half of the cam follower housing, showing the lower half of the ball race.

In the instant application, illustrated in Figures 1 and 2, the mechanical movement is mounted in a hollow head 23 that is bolted to a suitable support, for holding the device so that it may do useful work, through heavy flanges 24 welded to the outside of the head 23.

Four vertically extending hardened steel rails 25 are set flush with the inner wall of the hollow head, which is circular in cross section, as seen in Figures 1 and 2. These rails are positioned 90° apart and have semi-circular channels cut in the face thereof which act as races for a plurality of steel balls 26 which ride therein for a purpose to be disclosed hereinafter. Reference numeral 27 indicates a hollow cylindrical ram having a circular inner bore 29 and an end plate 28 adapted to have the punch elements of a die set mounted therein. The said punch elements being intended to co-operate with the die element of the set which is mounted on a bed, not shown. The outer diameter of the ram being such that it will snugly interfit the head 23 in a free sliding fit.

Four rectilinear ball receiving grooves 30 spaced 90° apart are cut in the outer wall of the ram and are semi-circular in cross section to complement the channels of the head rails 25 with which they co-operate to form a ball race having a circular cross section. A plurality of steel balls 26 ride in the race formed by the channeled rails 25 and the grooves 30. These balls lock the ram against rotation relative the head but permit the ram to freely reciprocate within the head toward and away from the bed 21. The rectilinear races are not completely filled with balls so that the balls will remain free rolling at all times, there being two or three balls less in each race than the number required to completely fill it.

Reference numerals 31 and 32 indicate a first pair of endless criss-crossed spiral cam tracks of substantially semi-circular cross section cut into the face of the bore 29 of the ram 27. Each cam track is formed to have longitudinally displaced portions 31a, 31b and 32a, 32b connected by spiral portions. The first pair of cam tracks are criss-crossed at points 180° apart, indicated by reference characters W and X. The longitudinal distance between the peak 31a and the trough 31b of track 31 and the peak 32a and the trough 32b of track 32 determines the distance traveled by the ram, which in an illustrative example may be taken at one inch. The tracks 31 and 32 are oriented to one another so that the peak 31a will be aligned with and above trough 32b and the peak 32a will be aligned with and above trough 31b, as seen in Figure 7.

A second pair of similar criss-crossed cam tracks 33 and 34 are spaced from the first pair longitudinally of the ram bore 20. Their cross-over points being indicated by reference characters Y and Z. This pair of tracks is also formed to have longitudinally displaced portions 33a, 33b and 34a, 34b connected by spiral portions. The longitudinal distance between the peak 33a and trough 33b of track 33 and peak 34a and trough 34b of track 34 being the same as that between the peaks and troughs of the first pair of tracks 31 and 32.

The two pair of criss-crossed tracks being oriented with reference to one another so that the cross over points W and X of the first pair are at 90° to the cross over points Y and Z of the second pair. All of the tracks are cut inwardly of the face of the ram bore a distance such that the vertical center line of the semi-circular walls are positioned inwardly of the plane of the ram bore 29. The lower edge 38 of each track being flat from the point of the vertical center line of the semi-circular channel to the face of the bore 29, as is seen most clearly in Figure 9. The upper edge of each track having a continuous groove 37 cut therein for a purpose to be hereinafter disclosed.

Two diametrically opposed openings 35 and 36 are cut through the ram wall of a size to clear the lower bearing support 39 of the rotor 40 in all possible positions of the ram 27. A cylindrical rotor 40 is journaled in bearings 41 and 42 supported on cross braces 39 and 43 respectively, anchored in the wall of the head 23, as shown in Figure 1. The rotor 40 is mounted co-axially within the ram 27 and is of a diameter to closely interfit the ram bore 29. The rotor being free to rotate on its bearings 41 and 42 within the ram 27. The ram being free to reciprocate relative the rotor within the head 23 but being held against rotation by the balls 26 as explained hereinabove.

The rotor 40 is driven by any suitable driving means which in the preferred form shown is an electric motor 44 mounted in the head 23 above the rotor and connected thereto through a flexible shaft 45. A handwheel, not shown, attached to the motor shaft at the upper end thereof enables the operator to slowly turn the rotor by hand in setting up a die set on the punch. The rotor 40 has two diametric bores 47 and 48 cut therethrough at right angles to its longitudinal axis and at 90° to one another. The center lines of the bores being spaced apart on the longitudinal axis of the rotor a distance equal to the vertical distance between the cross-over points W, X of the first pair of cam tracks and Y, Z of the second pair of cam tracks.

Reference numeral 49 indicates an axial bore in the rotor which intersects the aforesaid diametric bores 47 and 48. Four cam follower housings 50, 51, 52 and 53 are journaled in the ends of the rotor bores 47 and 48. Each cam follower housing has a plurality of free rolling balls 60 therein which engage the several cam tracks of the ram 40 as the rotor rotates. The construction of one of the cam followers identified by the reference numeral 50 is ilustrated in detail in Figures 9, 10, 11, 12, 13, 14 and 15, it being understood that the construction of all the housings 50, 51, 52 and 53 is the same.

Figure 11:
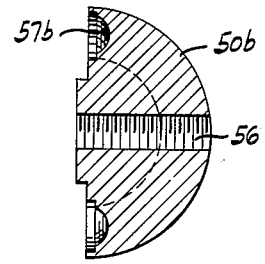
Figure 11 is a vertical sectional view taken along the line and in the direction of the arrows 11—11 of the Figure 10.
Figure 12:
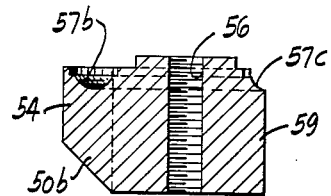
Figure 12 is a vertical sectional view taken along the line and in the direction of the arrows 12—12 of the Figure 10.
Figure 13:
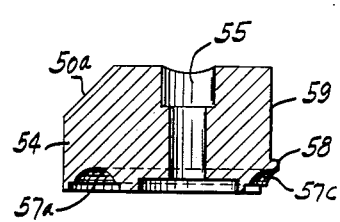
Figure 13 is a vertical sectional view of the upper half of the cam follower housing taken along the line and in the direction of the arrows 13—13 of the Figure 14.
Figure 14:
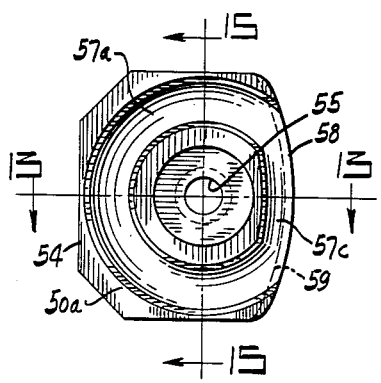
Figure 14 is a bottom plan view of the upper half of the cam follower housing, showing the upper half of the ball race.
Figure 15:
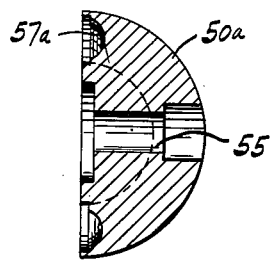
Figure 15 is a vertical sectional view taken along the line and in the direction of the arrows 15—15 of the Figure 14.
Figure 16:
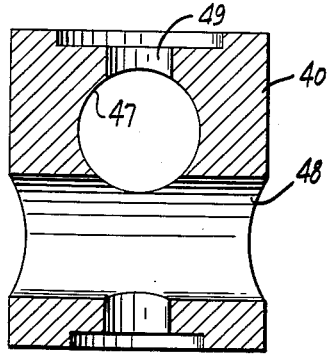
Figure 16 is a vertical section through the rotor with the cam followers removed.

The housing 50 in cylindrical in cross section and made up of two matching halves 50a and 50b held together by a bolt 61 which passes through a counter bored hole 55 in the upper half 50a to engage a threaded hole 56 in the lower half 50b as shown in Figure 11. Each housing has a flat rear face 54 and a curved front face 59 whose curvature matches that of the ram bore 29.

A circular ball race 57 is cut in the plane of the lateral axis of the assembled housing, one half of the race being cut in the upper half 50a, designated by reference numeral 57a, the other half being cut in the lower half 50b of the housing, designated by reference numeral 57b. The two half races 57a and 57b when joined edge to edge form a circular ball race of circular cross section adapted to retain a plurality of free rolling balls 60 therein.

The race 57 intersects the face 59 of the housing 50 to form an interrupted section 57c which is semi-circular in cross section, thereby causing the balls 60 when in this section of the race to extend beyond the curved face 59 of the housing and into the plane of its associated cam track as shown in the Figure 9. The circular race 57 is formed with two radii of curvature. The radius of curvature of the interrupted section 57c is made equal to the radius of curvature of the cam tracks of the ram, while the remainder of the race 57 is of a radius to enable the race to complete its course within the housing 50. The upper half 57a of the race 57 at the interrupted section 57c has the wall extended beyond the vertical center line of the race to form a flange 58 which extends beyond the vertical center line of contained balls 60 and acts to support the balls from above when they are subjected to upward thrusts as described hereinafter. The lower half 57b of the race 57 at the interrupted section 57c has the wall cut back of the vertical center line of the race so that when the balls 60 are in this section the vertical center line of the ball 60 lies in the plane of the lower edge 38 of its associated cam track 31 as seen in Figure 9. The flange 58 extends into the cam track groove 37. The interrupted section 57 of the race is complemented by its mating cam track 31 to continue the circular cross section of the race enclosure in the interrupted section of the race at the point it co-operates with the cam track. Thus the balls 60 are able to ride freely around and around in the race 57. The balls are spaced slightly apart in the race, so that they will not lock against one another and slide as a group. A total clearance of approximately 1/32 of an inch for the entire group is usually sufficient to assure a free rolling condition for the balls 60.

The assembled cam housing 50, just described, is journaled in the end of the rotor bore 47 and is free to oscillate therein (as indicated by reference numeral 50x in Figure 3) as the balls 60 follow the cam track 31 to permit the race 57 to follow the everchanging curvature of the cam track, as the rotor turns in relation thereto, to maintain alignment therewith at all times. The balls of housing 50 engage the track 31, the balls of housing 51 engage the track 32, the balls of housing 52 engage the track 33, and the balls of housing 53 engage track 34. It will thus be seen that the rotor and the ram are interconnected through a series of free rolling balls at four points 90° apart. It will be further apparent that the assembled rotor and cam follower housings cannot be inserted into the ram bore because the flanges 58 and the balls 60 extend past the vertical plane of the ram bore. In order to permit insertion of the rotor assembly into the ram bore, the cam follower housings are slid inwardly of their respective bores into the area of the rotor axial bore 49 until the balls 60 are entirely within the plane of the bounding surface of the rotor. The rotor is then inserted into the ram bore and the interrupted sections 57c of the races are aligned with their respective cam tracks. A cam follower locating shaft 62 having four flat faces 62a, 62b, 62c and 62d, as seen in Figures 5 and 6, is inserted into the bore 49. The inserted shaft 62 pushes the several cam follower housings outward of their respective bores to co-operatively engage their balls with their respective cam tracks. The flat faces of the shaft 62 bear against the flat rear walls 54 of the cam follower housings. The diameter of the shaft through the flats being such that the cam follower housings are held in proper position to provide the desired clearance between the housings and their co-operating cam tracks.

When the rotor 40 is rotated by the motor 44, it rotates co-axially within the ram bore 29 with each set of cam follower balls 60 engaged in its mating cam track 31, 32, 33 or 34. The balls of the first or upper pair of cam followers 50 and 51 engage the upper or first pair of criss-crossed cam tracks 31 and 32 respectively. The balls of the second or lower pair of cam followers 52 and 53 engage the lower or second pair of criss-crossed cam tracks 33 and 34 respectively. All of the cam follower balls engage their respective cam tracks at the relative same position in the endless paths of the cam tracks. That is they are all simultaneously at the peak, trough or intermediate points of their respective tracks. Therefore, as the balls follow their respective cam tracks, as the rotor turns relative to the ram, the ram is moved axially of the rotor within the head 23. Since the ram 27 is prevented from rotating by the balls 26, it reciprocates vertically in the head 23 toward and away from the bed as the cam follower balls 60 engage the undulating cam tracks of the ram. The free rolling balls 60 in the various cam follower races roll around and around in their races, and successively engage their mating cam tracks as they pass through the interrupted section of each cam follower race. The engagement between the balls 60 and their respective cam tracks is a free rolling one so that the thrust of the balls is almost entirely free of friction, making for an operation that is free of vibration. Since there is room for at least three balls in the interrupted section of each race, their engagement with their respective cam tracks causes them to orient their respective housings so that the plane of their races are maintained in alignment with the path of the undulating cam tracks as the rotor turns. The cam follower housings being free to oscillate in their respective rotor bores as described hereinabove. Pressure that would ordinarily be exerted on the vertical center line of the balls 60 as the ram is driven down against the work on the bed, not shown (if the co-operating section of the race and track had their edges exactly on the vertical centerlines of the race and track) is shifted away from the ball center-line by the overhanging race flange 58 which extends beyond the vertical center line of the track, as shown in Figure 9, and supports the ball 60 from above on either side of its center line. Similarly the flat portion 38 of each cam track supports the center line of the ball from below. Thus edge pressure at the ball center lines which would eventually cause crystallization and fracture of the balls is avoided.

The cam tracks being of the harmonic motion type the reciprocation of the ram is brought about without any sudden stops and starts and in a free moving vibrationless manner. These speeds of between 2,000 and 3,000 strokes per minute may be easily developed with this press. The flywheel action of the swiftly revolving rotor makes the use of an extra external flywheel unnecessary, making for a compact entirely self contained head.

It will now be clear that there is provided a device which accomplishes the objectives heretofore set forth. While the invention has been disclosed in its preferred form, it is to be understood that the specific embodiment thereof as described and illustrated herein is not to be considered in a limited sense as there may be other forms or modifications of the invention which should also be construed to come within the scope of the appended claims.

I claim:

1. A mechanical movement comprising in combination, a fixed hollow head, a hollow cylindrical ram slidably mounted within the head and adapted to freely reciprocate therein the said ram having a first pair of criss-crossed endless spiral cam tracks cut in the inner face thereof and a second pair of criss-crossed endless spiral cam tracks spaced from the first pair, the crossover points of the second pair being positioned 90° from those of the first pair, all of the tracks being semi-circular in cross-section, the peak of the tracks of each pair being aligned with the trough of its paired track; a cylindrical rotor co-axially mounted in the head within the hollow ram having first and second diametrical bores therethrough at 90° to one the other, the axes of said bores being spaced apart on the longitudinal axis of the rotor a distance equal to the vertical distance between the cross-over points of the first and second paired cam tracks, a plurality of cylindrical cam follower housings journaled in the said bores at the ends thereof, each of the said housings having a circular ball race therein of circular cross-section lying in the plane of its lateral axis and interrupted at that face facing toward its mating cam track, the interrupted section of the race being semi-circular in cross-section and being complemented by the semi-circular wall of its mating cam track to maintain the continuity of the race; a plurality of balls riding free in said race and engageable with the said cam track when in the interrupted section of the race, the balls of the housings journaled in the first bore being engaged with the first pair of tracks, the balls of the housings journaled in the second bore being engaged with the second pair of tracks, each of the housings being free to oscillate in its bore to maintain the interrupted section of its race in alignment with the complementary face of its mating cam track at all times; and rotary driving means mounted in the head and coupled to the rotor for rotating the same within the ram relative to the cam tracks, whereby the cam follower balls in following their respective tracks cause the ram to reciprocate within the head relative to the rotor, toward and away from the base.

2. A mechanical movement of the type defined in claim 1 and further characterized by the radii of the interrupted sections of the cam follower races being equal to the radii of their complementary tracks.

3. A mechanical movement of the type defined in claim 1 and further characterized by each cam follower housing having its race wall, at the interrupted section, extended into the plane of the ram wall beyond the vertical center line of its associated cam track, each track having a groove cut therein to receive the said extended race wall.

References Cited in the file of this patent

UNITED STATES PATENTS

| | | |
|---|---|---|
| 975,591 | Whitney | Nov. 15, 1910 |
| 1,041,569 | Bade | Oct. 15, 1912 |
| 1,233,858 | Farmer | July 17, 1917 |
| 1,948,526 | Liles | Feb. 27, 1934 |
| 1,961,843 | Chenette | June 5, 1934 |
| 1,985,901 | Liles | Jan. 1, 1935 |
| 2,214,584 | Heydenburg | Sept. 10, 1940 |
| 2,246,733 | Kiefer | June 24, 1941 |